(12) United States Patent
Baker et al.

(10) Patent No.: US 8,340,258 B2
(45) Date of Patent: Dec. 25, 2012

(54) SYSTEM, METHOD AND APPARATUS FOR CONTROLLING IMAGE ACCESS IN A VIDEO COLLABORATION SYSTEM

(75) Inventors: Mary G Baker, Palo Alto, CA (US); Ian N Robinson, Pebble Beach, CA (US); Mitchell Trott, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 12/848,021

(22) Filed: Jul. 30, 2010

(65) Prior Publication Data

US 2012/0026274 A1 Feb. 2, 2012

(51) Int. Cl.
*H04M 11/00* (2006.01)
(52) U.S. Cl. .................. 379/93.21; 348/14.12
(58) Field of Classification Search ............... 348/14.01, 348/14.12; 379/93.21, 158, 202.01
See application file for complete search history.

(56) References Cited

U.S. PATENT DOCUMENTS

| | | | |
|---|---|---|---|
| 5,949,474 A * | 9/1999 | Gerszberg et al. ......... | 348/14.01 |
| 2004/0257431 A1 * | 12/2004 | Girish et al. ............... | 348/14.01 |
| 2009/0019367 A1 | 1/2009 | Cavagnari et al. | |
| 2009/0309955 A1 | 12/2009 | Gladstone | |
| 2010/0110160 A1 * | 5/2010 | Brandt et al. ............... | 348/14.08 |
| 2011/0215898 A1 * | 9/2011 | Ramos-Elizondo et al. .. | 340/5.2 |

FOREIGN PATENT DOCUMENTS

| | | |
|---|---|---|
| WO | WO-9749243 A1 | 12/1997 |
| WO | WO-2009089585 A1 | 7/2009 |

OTHER PUBLICATIONS

He, Helen Ai ~ "A Twinned Media Space: Twinning a Virtual Presence" ~ Department of Computer Science ~ University of Calgary ~ CANADA ~ 2010 ~ pp. 12.
Huang et al., ~ "A General Purpose Virtual Collaboration Room" ~ IEEE Xplore ~ Oct. 1999 ~ pp. 21-29.
Kim et al., ~ "The Magic Window: Lessons From a Year in the Lite of a Co-Present Media Space" ~ CM—GROPU '07 ~ Nov. 2007 ~ 10 pages.
Neustaedter et al ~"Blur Filtration Fails to Preserve Privacy for Home-Based Video Conferencing" ~ ACM Trans on Computer-Human Interaction~v13 No. 1 ~ Mar. 2006~36 pgs.

* cited by examiner

*Primary Examiner* — Olisa Anwah

(57) ABSTRACT

The present invention provides a computer implemented method, comprising the steps of: determining using data from a sensing device, when a moveable obscuring structure is in a closed position. When the obscuring structure is in the closed position, the transmission of accessible images captured by an image capture device at the location of a local user is to remote user locations in a video conference session is prevented.

14 Claims, 8 Drawing Sheets

SYSTEM, METHOD AND APPARATUS FOR CONTROLLING IMAGE ACCESS IN A VIDEO COLLABORATION SYSTEM

BACKGROUND

Video telepresence systems are often meant to present themselves as "always available" so that it feels to users as if the two locations have been brought together, allowing for natural interactions as if the users were in close physical proximity. However, because these systems are always available, they introduce privacy problems when users desire a higher level of privacy then the system provides. A person being viewed by another person at a remote location may attempt to control the privacy at his location by turning off the camera, placing a lens cap over the camera lens or exiting the viewing range of the camera. These solutions may solve the privacy problems but introduce new problems with respect to image availability and presence indication.

A further problem with telepresence systems is that it is often not obvious and/or intuitive to a user that a telepresence system is transmitting signals (e.g., audio/visual) to a remote location. For example, a local user might not be able to determine what is displayed to a remote user. Thus, the local user may be unaware that the camera is capturing images or audio of them.

BRIEF DESCRIPTION OF DRAWINGS

The figures depict implementations/embodiments of the invention and not the invention itself. Some embodiments are described, by way of example, with respect to the following Figures.

The drawings referred to in this Brief Description should not be understood as being drawn to scale unless specifically noted.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

As non-intrusive telepresence systems become increasingly integrated into home and work spaces, people need an intuitive understanding of when remote users are possibly observing them and mechanisms for ensuring they are not observed when they do not wish to be. In addition, it is important to have intuitive methods for indicating one's availability so that local and remote users can easily understand who is available for collaboration.

Consider a telepresence system placed on a wall in a living room to allow natural interaction with a family member residing in another location. A local user needs to understand easily: (1) when a remote user may be viewing him; (2) whether the remote user is available to interact with the local user regardless of whether the local user is currently available to the remote user, and (3) how to alert the remote user that the local user is available to interact. In the present invention, the local user uses a physical curtain or other obscuring structure to indicate availability for participating in a video collaboration system. When the obscuring structure (i.e., curtain) is in the closed position, the local user is not available for interacting with remote users and no accessible image is transmitted to remote users. In this case, a graphical representation of closed curtains or other indicator noting that the local user is not available to the remote users may be displayed. When the obscuring structure is in the open position, the configuration settings determine whether accessible images are being transmitted and to whom and also, to whom the local user's availability is displayed to.

Figure 1:
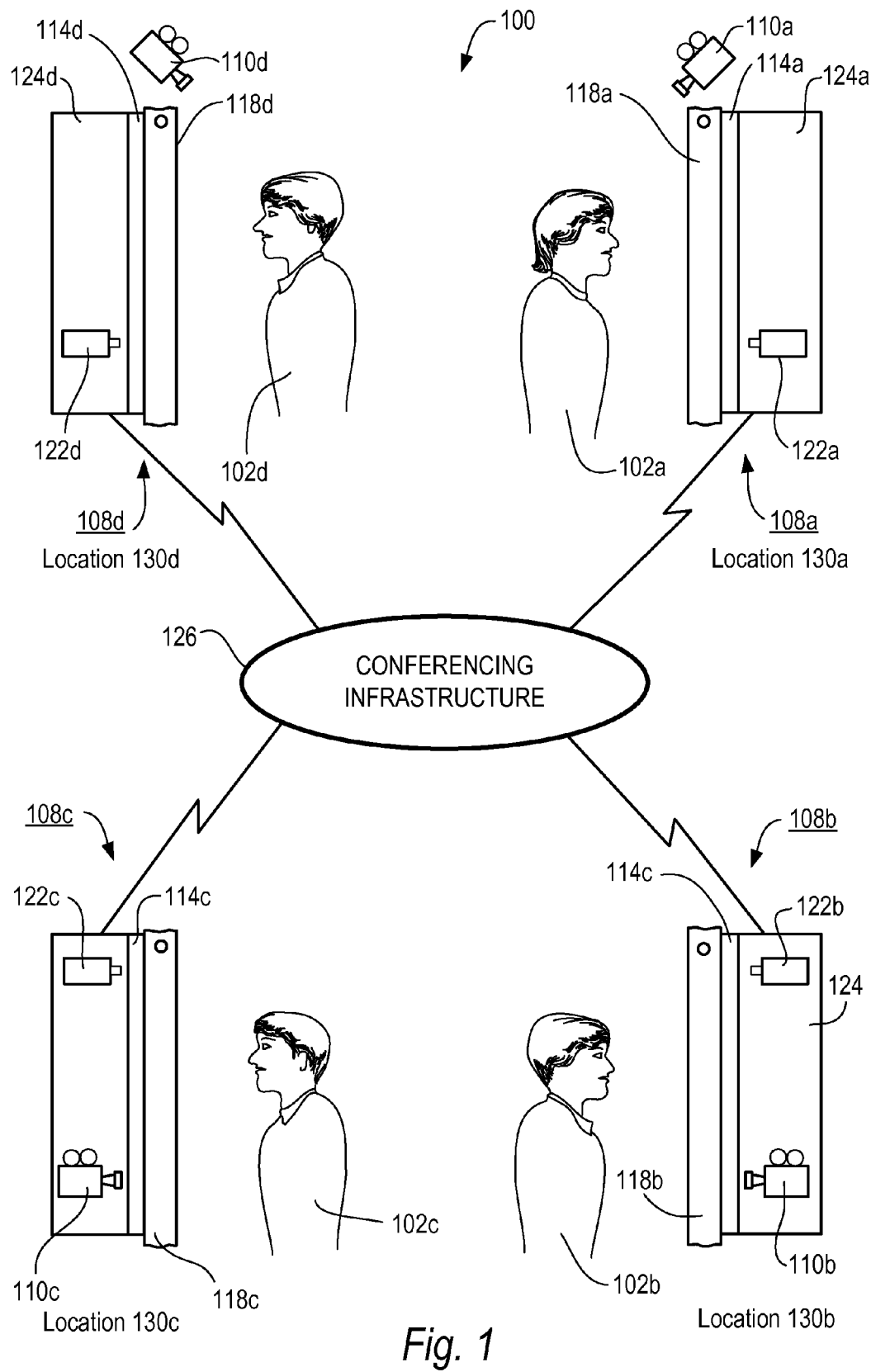
FIG. 1 illustrates an exemplary depiction of a video collaboration environment for providing privacy control and for indicating presence according to an embodiment of the invention.

Embodiments of the present invention are directed to visual collaboration systems. Referring to FIG. 1 shows an exemplary depiction of a video collaboration system 108*a-d* comprising: an image capture device 110*a-d*; a display screen 114*a-d*; a moveable obscuring structure 118*a-d* for obscuring the display screen 114*a-d* when the moveable obscuring structure 118*a-d* is in the closed position; at least one sensing device (not shown in FIG. 1) capable of sensing when the moveable obscuring structure 118*a-d* is in the closed position, wherein responsive to determining that the moveable obscuring structure 118*a-d* is in the closed position, the transmission of accessible images captured by the image capture device to the remote location is prevented.

Referring to FIG. 1 shows an exemplary depiction of a video collaboration environment 100 where multiple users 102*a-d* are connected via a networking infrastructure 106 according to an embodiment of the invention. Visual collaboration systems or video telepresence systems are intended to look and feel as if they are a window or port through which people in different geographical locations can naturally interact as if they were in close proximity. For example if the video collaboration system were in a home environment, a video collaboration system 108*a* at location 130*a* mighty be placed on a living room wall to allow natural interaction with a user 102*b* (a family member) residing at location 130*b*, who has a corresponding video collaboration system 108*b* hanging on their living room wall. The network infrastructure allows for communication between the multiple users 102*a-d*, each user 102*a-d* communicating via a video collaboration system 108*a-d* at a locations 130*a-d*.

Various different types of video collaboration systems may be used. For example, the video collaboration system 102a might be implemented with a simple rear screen projection display, where a projector 122a is located behind the display screen 114a in a housing 124a. In the embodiment shown at location 130a, the image capturing device 110a is located physically above the display screen114a and captures images of location 130a. In the configuration shown at location 130b, the in video collaboration system 102b includes a see through display screen 114b with an image capturing device 110b located behind the display screen 114b. In this embodiment, the see through display screen enables the image capture device 110b to capture images of local objects through the display screen and via the conferencing infrastructure 126, sends the captured images to another location. In addition, the display screen 114b can simultaneously display images from a remote site that the user or local site is communicating with. Such systems, where the camera is positioned behind a see through display screen, are known and are described for example in the article K.-H. Tan, I. Robinson, R. Samadani, B. Lee, D. Gelb, A. Vorbau, B. Culbertson, and J. Apostolopoulos, "Connectboard: A remote collaboration system that supports gaze-aware interaction and sharing," in IEEE MMSP 2009, Rio de Janeiro, Brazil, October 2009.

As previously stated, each video collaboration system includes an image capture device for capturing images of the location of the local user. In one embodiment, the image capture device is a video camera and the term video camera may be used interchangeably with image capture device in this case. In the embodiment shown in FIG. 1, for example, the image capture devices 110a, 100c, 100n are shown positioned above and centered with the display screen. In an alternative, where a see through display is available (114b at location B), the image capture device 110b is physically located behind the display screen 114b. Although various camera positions are possible, preferably the image capture device 114a-d is in a position that captures a wide view of the location 130a-d and any users 102a-d physically located in the room. The image capture device 110a-d may have the ability to change the angle and or focus the camera 110a-d to provide a closer range view of the local users 102a-d or other object of interest at the site.

Whether the image capture device 110a-d transmits images of the local site to a remote location is controlled in part by the position of the physically obscuring structure 118a-d. If the local user closes the physically obscuring structure 118a-d so that the obscuring structure is in a closed position, then the system will not make available accessible images of the local user's location to the remote users location. If the local user opens the obscuring structure, then whether the captured images are transmitted to the remote user's location depends upon the local user's configuration settings.

According to the present invention, the video collaboration system 108 includes an obscuring structure. The obscuring structure (i.e., curtain, etc.) comprising: at least a partially obscuring structure capable of being moved into a first open position relative to a display screen in a video collaboration system and a second closed position relative to the display screen of a video collaboration system, wherein responsive to a sensing device detecting a closed position relative to the display screen, a determination is made to prevent transmission of accessible video images captured by the video capture device to the at least one remote user in a video conference. In one embodiment, the obscuring structure is a curtain. However, other obscuring structures such as a shade, a screen or any other obscuring structure that are easily moveable by the user across the display screen between open and closed positions. Moveable obscuring structure may be completely obscure or partially obscure the display screen. The act of obscuring of the display screen conveys to the user, that accessible images are not being transmitted to remote users and that the system video collaboration system 108 is currently not available for collaboration.

Figure 2A:
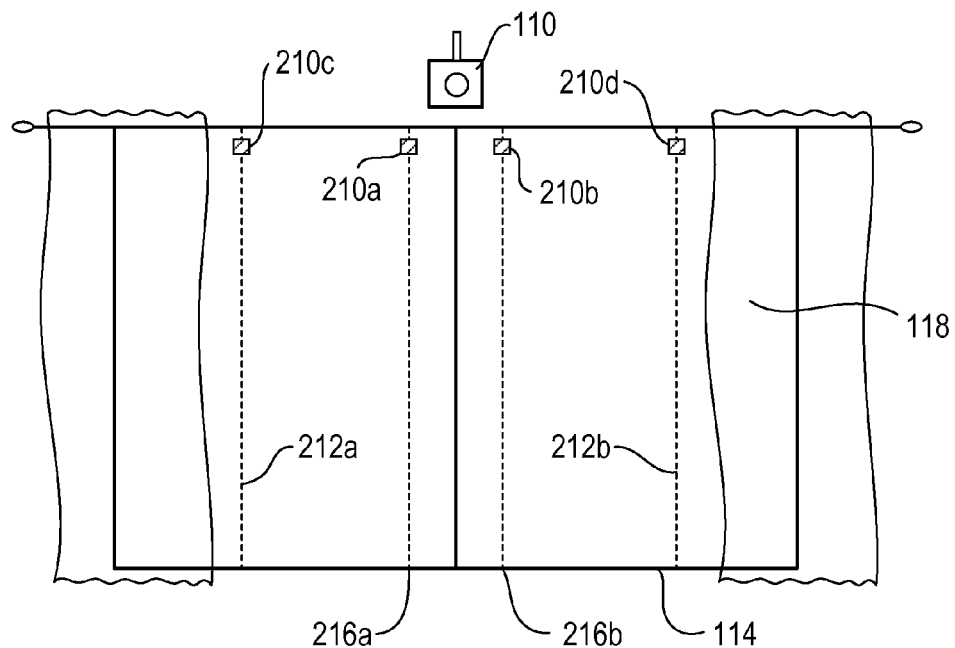
FIGS. 2A-2B illustrate a possible obscuring structure/sensor configuration for one of the video collaboration sites shown in FIG. 1 according to an embodiment of the invention.
Figure 2B:
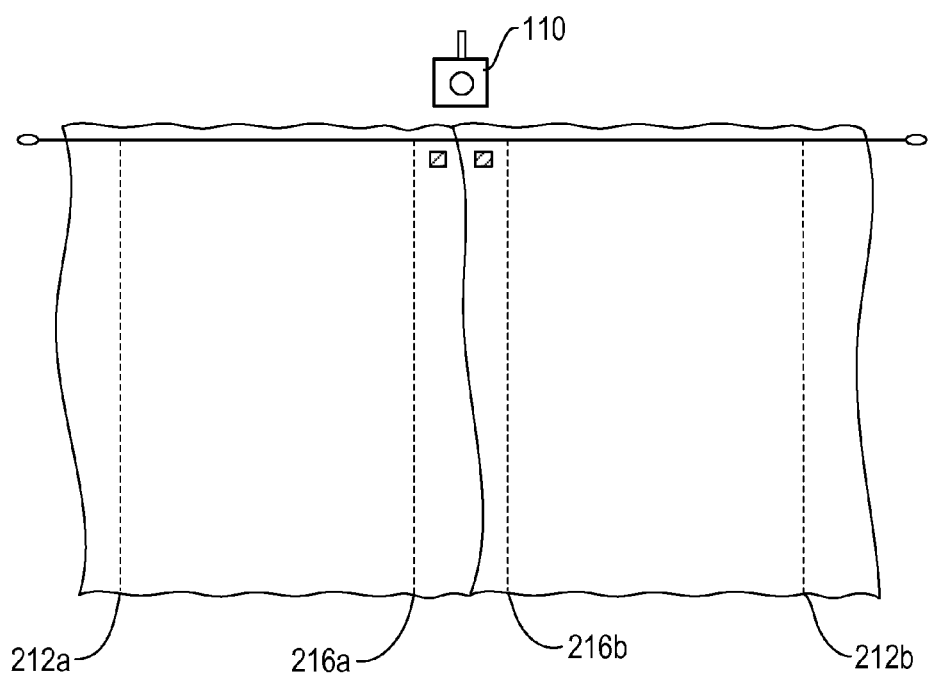
Figure 3A:
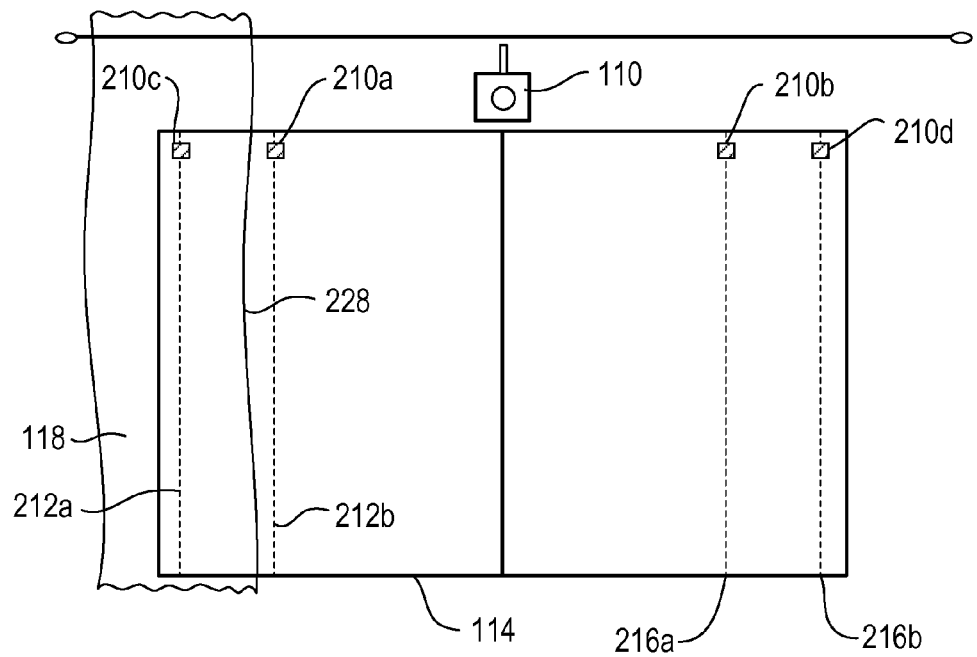
FIGS. 3A-3B illustrate a possible obscuring structure/sensor configuration for one of the video collaboration sites shown in FIG. 1 according to an embodiment of the invention.
Figure 3B:
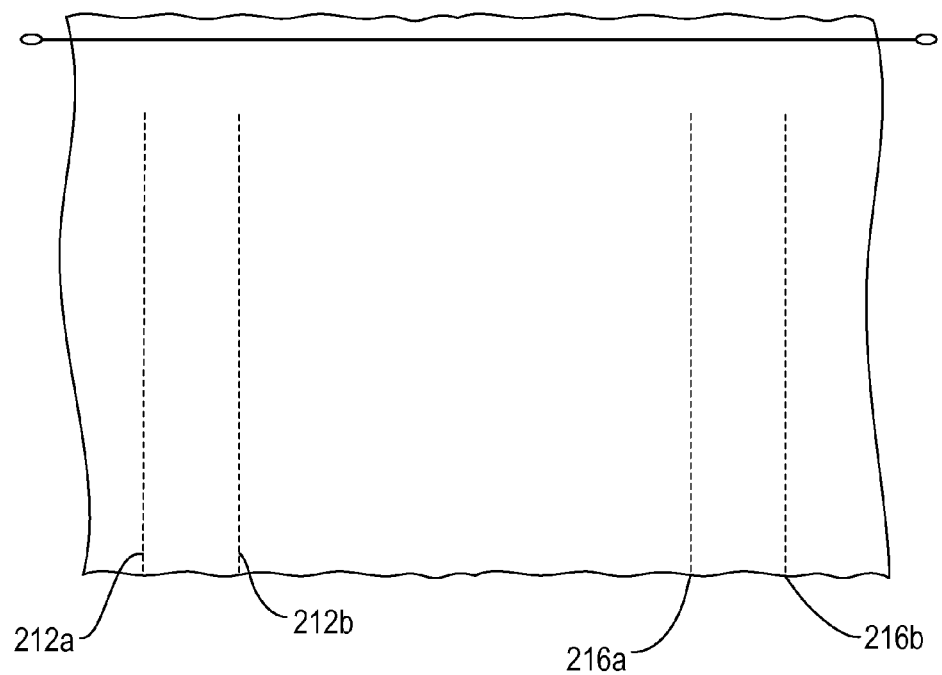
Figure 4A:
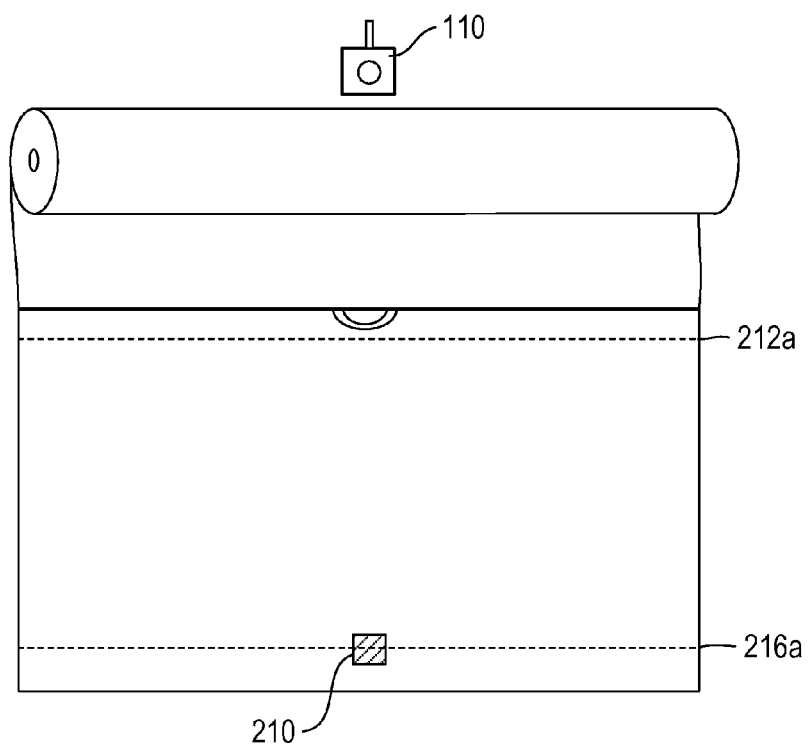
FIGS. 4A-4B illustrate a possible obscuring structure/sensor configuration for one of the video collaboration sites shown in FIG. 1 according to an embodiment of the invention.
Figure 4B:
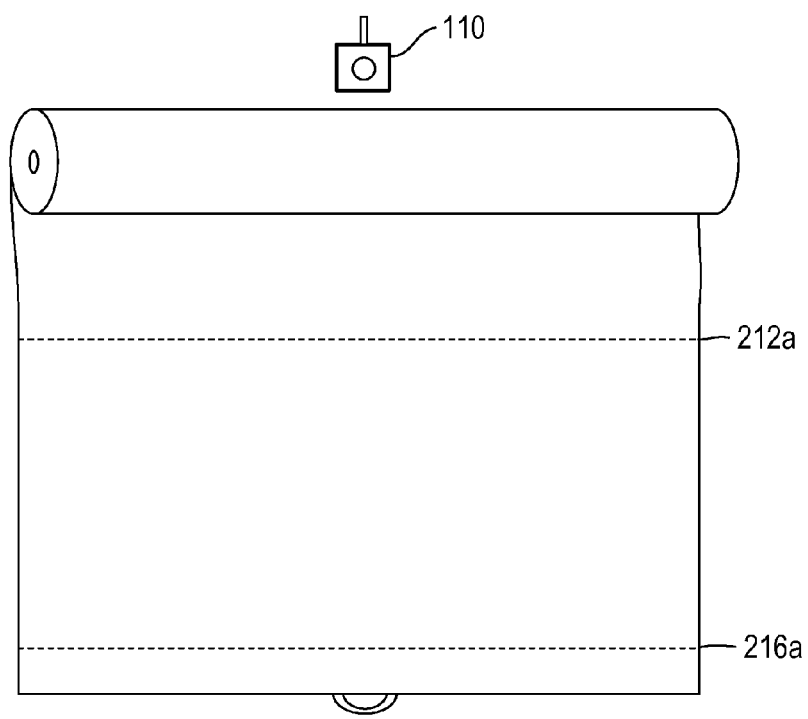

FIGS. 2A-2B, 3A-B and 4A-B illustrate different obscuring structure/sensing device configurations that may be used at a video collaboration sites shown in FIG. 1 according to an embodiment of the invention. The configurations in FIGS. 2A and 2B, show a dual curtain implementation with FIG. 2A showing both sides of the curtain in the open position and FIG. 2B showing both sides of the curtain in the closed position. The configuration shown in FIGS. 3A and 3B is a single curtain implementation with FIG. 3A showing the open position of the curtain and FIG. 3B showing the closed position. Instead of a curtain being the obscuring structure, FIG. 4A shows a configuration where the obscuring structure is a single pull shade. FIG. 4A shows the open position of the shade and FIG. 4B shows the closed position of the shade.

Although in the embodiment shown in FIGS. 3A and 3B, the obscuring structure 118 when in the closed position covers the lens of the image capture device 110, it is not critical to the implementation of the invention for the obscuring structure to cover the lens-since movement of the obscuring structure into the closed position is the key to turning off transmission of accessible images. In some embodiments, for example, the configuration of FIGS. 2A-2B and 4A-4B where the image capture device lens is never covered by the physical curtains, may be preferred.

When the obscuring structure 118 is in the closed position, accessible images of the local user's location are not transmitted to the remote user. In one embodiment, when the obscuring structure 118 is in the closed position—the image capture device 110 of the local user is turned off. In another embodiment, images captured by the image capture device are simply not made accessible to the remote user, because they are not transmitted to the remote user. In the previous examples, the images are inaccessible since the remote user never receives the images. In other embodiments, images are made inaccessible to the remote user in other ways. For example, in one embodiment, viewing is disabled by encrypting the transmission and refusing to give out the key to the remote locations when the sensing device 210 indicates that curtains 118 are closed.

In some embodiments, where the lens of the image capture device 110 is not covered by the obscuring structure 118 and able to capture images, it might be desirable to keep the image capture device on. In these cases, the image capture device could alternatively be being used for purposes other than providing video for a video collaboration session. For example, the image capture device could be used inside the local user's room to capture the local user's gestures, when gestural control is used, for example, to change TV channels within the room. In an alternative embodiment, the image capture device could be used for security purposes, for example, to count number of people in room or to track if someone enters the room after a certain time. In an alternative embodiment, the image capture device might be available for recording images inside the local user's room for their own purposes (i.e. showing friends and family) and not for video collaboration purposes.

According to the present invention, the video collaboration system 108 includes a display screen 118. In one embodiment, the references to an open and closed position is made with respect to the display screen or the frame or area around or in the vicinity of the display screen. Typically, when the moveable obscuring structures are in the closed position, the entire display screen is covered by the obscuring structures and when the obscuring structures are in the open position, enough of the display screen is shown to provide a view of the remote user's location in the video collaboration session. In one embodiment, the location of the boundaries of the open and closed position and the sensor placement is set using the configuration module 520 of the collaboration control module 510 shown in FIG. 5.

Figure 5:
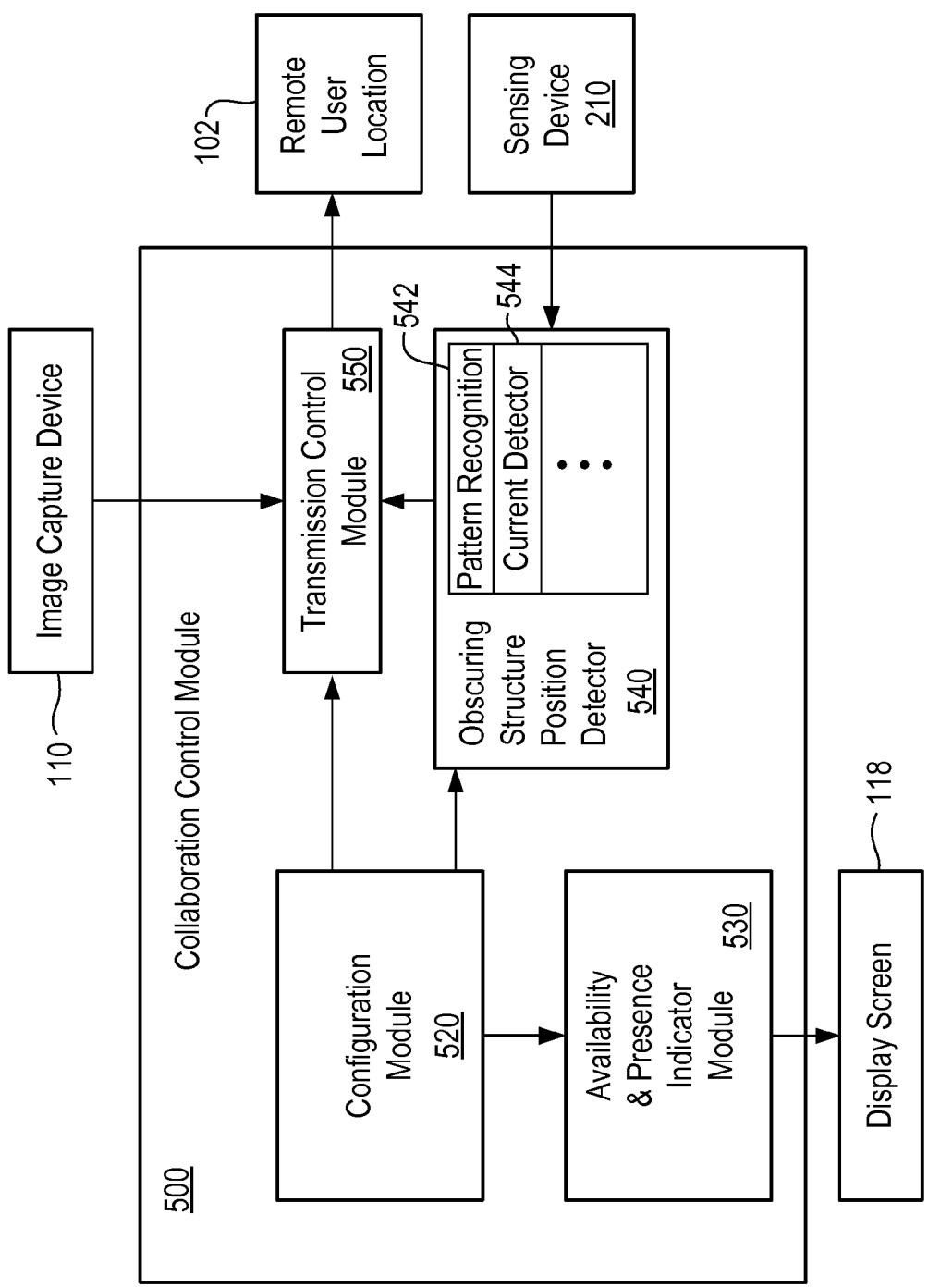
FIGS. 5 illustrates a simplified block diagram of a collaboration configuration and control module for access control in a video collaboration system according to an embodiment of the invention.

FIG. 5 shows a simplified block diagram of a system 500 for enabling a collaboration control module 502 to providing access to video images in configuration settings and the detected position of the obscuring structure. The configuration settings are set using the configuration module 520 and can be (1) default settings set by the manufacturer, (2) settings established by the system administrator, or alternatively (3) settings established by the local user using the video collaboration system.

As shown in FIG. 5, the collaboration control module 510 includes: a configuration module 520, an availability and presence indicator module 530, an obscuring structure position detector 540 and a transmission control module 550. In one embodiment, the configuration module 520 is used to configure the open and closed conditions which determine the conditions under which the obscuring position detector 540 will detect an open and closed position. Based on the detection of the open or closed position, the transmission control module 550 will determine the type of transmission that is accessible and to what subgroup of remote participants the captured images are accessible to.

The obscuring structure position detector 540 analyzes data input from the sensing device 210 and based on the sensing device data and the settings of the configuration module 520 determines whether the obscuring structure is in the closed or open position. Whether the obscuring device is in the closed or open position is input from the transmission control module 550. This information is used in combination with information from the configuration module 520 to determine whether images and the type of images (accessible or inaccessible) are sent to the remote user locations 102*a-d*. The availability and presence indicator module 530 uses information from the configuration module and the remote users to determine what remote users are available to interact with and who the local user is available to interact with. This information is most conveniently displayed for example, as shown in FIG. 6B.

Referring to FIG. 1 shows a side cross-sectional view of the display screen, user viewing the display screen and physical obscuring structure. However, the movement of the physical obscuring structure between an open and closed position can best be understood with reference to FIGS. 2A-2B, 3A-B and 4A-B. FIGS. 2A-2B, 3A-B and 4A-B illustrate different obscuring structure/sensing device configurations that may be used at a video collaboration sites shown in FIG. 1 according to an embodiment of the invention.

Referring to FIGS. 2A and 2B, two curtains are pulled along a rod using a side to side movement towards the center of the display to the closed position. The dotted lines 212*a* and 212*b* are representative of the open position boundaries with respect to the display screen 114. The dotted lines 216*a* and 216*b* are lines representative of the closed position boundaries. For the case where the curtains are being moved away from the center of the display screen 114, once the curtains are moved past the open boundaries 212*a* and 212*b*, the curtains are considered to be in the open position. For the case where the curtains are being moved towards the center of the display screen 114, once the curtains are moved past the closed position boundaries 216*a* and 216*b*, the curtains are considered to be in the closed position.

Figure 6A:
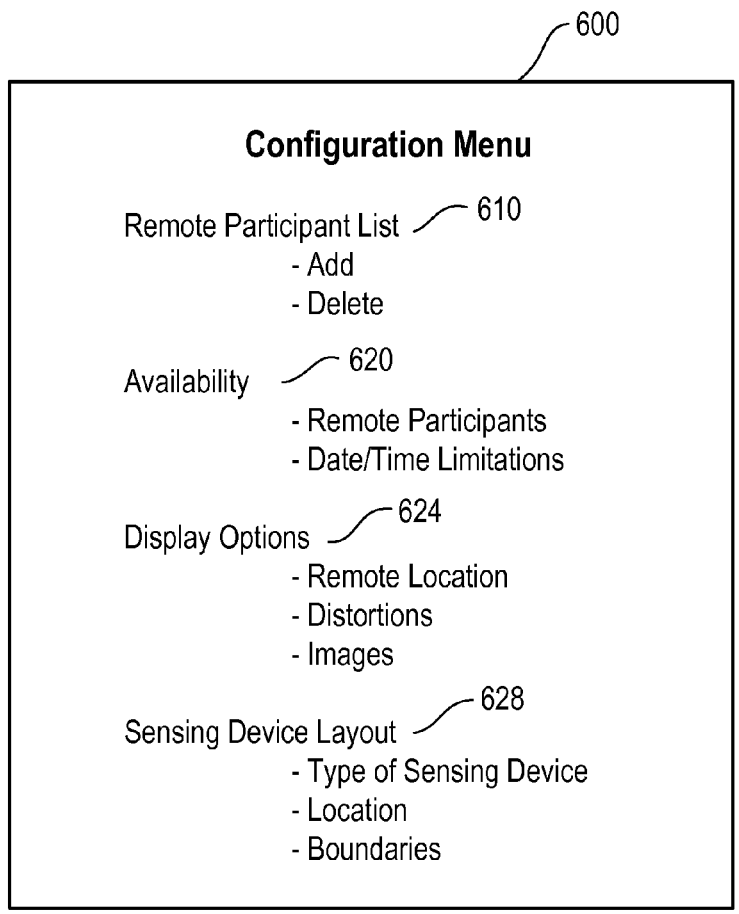
FIG. 6A shows an exemplary menu for a video collaboration system while in configuration mode according to an embodiment of the invention.
Figure 6B:
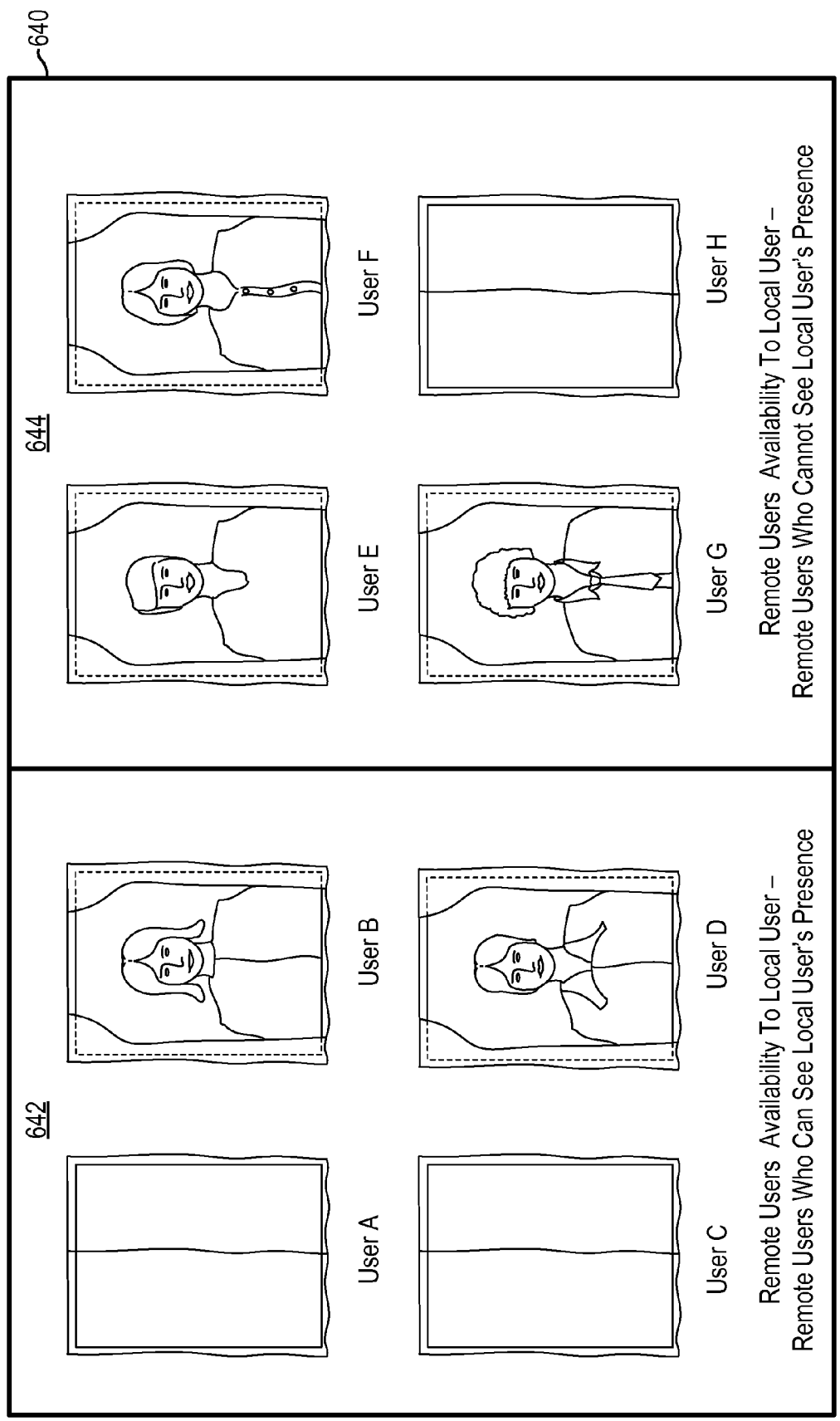
FIG. 6B shows a combined screen display indicating availability and presence of users according to an embodiment of the invention.

As previously stated, the collaboration configuration settings can include the boundary positions, the type of sensors used, etc. as shown, for example, at line 628 in FIG. 6A. These settings could be entered, for example, by a user or system administrator setting up the video collaborations while in the configuration mode. This mode, which allows the video collaboration parameters to be configured, is controlled by the configuration module 520 of the collaboration control module 510.

Referring to FIGS. 3A and 3B show an obscuring structure/sensing device configuration where similar to FIGS. 2A-2B, the obscuring structure is a curtain. However, instead of a dual-curtain configuration, a single curtain is used. Referring to FIG. 3A shows the curtain in the open position of the curtain while FIG. 3B showing the single curtain moved to the closed position. In the embodiment shown in FIGS. 3A and 3B, sensing devices 210*a* and 210*b* are positioned to sense when the obscuring structure is in the closed position and sensing devices 210*c* and 210*d* are positioned to sense when the obscuring structure is in the open position.

In contrast to the embodiments shown in FIGS. 2A and 2B, which show a boundary which the curtain must move past to be in the open or closed position, the implementation shown in FIGS. 3A and 3B includes a region defined by two position boundaries. For example, FIG. 3A shows a dotted line 216*a* representative of first closed position boundary and dotted line 216*b* representative of a second closed position boundary. In one embodiment, if the edge 228 of the curtain 118 is in between the first closed boundary position 216*a* and the second closed boundary position 216*b*, then the curtain is considered to be in the closed position. Alternatively, in another embodiment if the edge 228 of the curtain 118 is past the boundary second position boundary or in between the first closed boundary position 216*a* and the second closed boundary position 216*b*, then the curtain is considered to be in the closed position. The sensing device layout, including the open and closed position boundaries, the location of the sensors, and what conditions need to be met for the obscuring structure to be in the closed position, for example, can be set while in the configuration mode as shown on line 628 of FIG. 6A.

Referring to FIGS. 4A and 4B show an obscuring structure/sensing device configuration where instead of a curtain being the obscuring structure, a single pull shade is used. Referring to FIG. 4A shows the open position of the shade. FIG. 4B shows a shade in the closed position of the shade. Instead of being pulled side to side as shown in FIGS. 2A-2B and 3A-3B, the pull shade in FIGS. 4A-4B is pulled from top to bottom.

Referring to FIGS. 4A and 4B, the dotted line 212*a* is representative of the open position boundary. The dotted line 216*a* is a line representative of the closed position boundary. In the embodiment shown in FIG. 4B, a sensing device 210 is positioned so that the sensing device is aligned with the closed position boundary. Referring to FIG. 4A, when the shade 114 is positioned so that it is above the open position boundary 212*a*, it is considered to be in the open position. When the shade is pulled down so that it passes the closed position boundary 216*a*, then the shade is considered to be in the closed position.

As previously stated, the video collaboration system includes at least one sensing device capable of sensing when the moveable obscuring structure is in the closed position. Although in this application we describe a few types of sensing devices and their configurations, the types listed are for purposes of example and many different type of sensing devices could be used. Whatever the type of sensing device, the sensing device used should have the ability to determine whether the curtain or obscuring structure is in the closed or open position. How the sensing device determines the curtain position—depends on the type of sensing device used, it's physical location within the system, etc.

In some embodiments the sensing devices 210 are physically embedded in or attached to in the moveable obscuring structure and are thus moveable. In another example, the sensing devices are stationary and are integrated into or attached to the display screen or display screen frame or in the vicinity of the display. In other embodiments, a combination of stationary and moveable sensing device are used.

A sensing device 210 is typically comprised of at least a sensor and may also include other supporting sensing components. Referring to FIG. 5, data from the sensing device 210 is input into the obscuring structure position detector 540. Dependent upon the type of sensor used, different modules within the obscuring structure position detector module 540 recognizes and processes the sensing device data. For example, in one embodiment the supporting components of the sensing device are two magnets that attract each other when physically within a predefined range. When the two magnets touch, a closed electric circuit is formed. For this case, the current detector component 544 of the obscuring structure position detector would process the sensing device signal and determines from the sensed data if the obscuring structure is in the open or closed position. Other types of sensing devices could be used. For example, in one embodiment the sensing device includes a Hall effect switch to detect the closed position. For other types of sensing devices, say where an optical sensor is used, other components of the detector 540 (i.e., the pattern recognition component 540) may be used.

The previously described sensing device is responsive to the supporting components of the sensing device being in physical proximity. For example, in the embodiment shown in FIGS. 3A and 3B, one magnet could be embedded in the curtain 118 and another component of the magnet could be attached is attached to the frame of the display screen. When the two supporting components of the sensing device are in proximity to each other and connect a circuit closed—indicating that the curtain is in the closed position. In one embodiment, when current is sensed the obscuring structure is in the closed position and a signal is input to the transmission control module 550 from the obscuring structure position detector 540 indicating that transmission of accessible video images to the remote users should be terminated.

In one embodiment, the invention includes sensing device (s) configured to detect the distance of objects from a closed position boundary in order to determine the position of the obscuring structure. When the sensing device is at the closed position boundary or alternatively within a predetermined distance of the closed position, transmission of accessible images is terminated to the at least one remote participant. Examples of such sensing devices for determining distance of objects from a closed position boundary include ultrasonic range sensors and depth cameras (depth from stereo, time of flight or structured light.)

In one embodiment, the sensing device being used includes at least an optical sensor. Referring to the embodiment shown in FIGS. 3A and 3B, in one embodiment an optical sensor is placed in the frame of the display screen and a pattern that can be easily read by the optical sensor is established on interior side of the curtain that is facing the optical sensor. The pattern can be part of the fabric, or alternative a pattern on a separate piece of fabric or material that may be sewn on to or adhered to the fabric, etc. As the curtain is pulled past the optical sensor embedded in the frame of the display screen, the optical sensor reads the pattern and send the result to a pattern recognition component in the curtain position detector component. When the required portion of the pattern has been read, the optical sensor recognizes that the curtain has been pulled past the optical sensor and that the curtain is in the closed position.

In the present invention, when the physical curtain or obscuring structure is in the closed position, the local user in the room knows that they have complete privacy with respect to remote users. No remote users can view their location and any images captured by the image capture device are not transmitted to the remote users in a fashion that is accessible to the remote users. The state of an open curtain, is more ambiguous. When the curtain is in the open state, images accessible to the remote user may or may not be transmitted. When the curtain is in the open curtain state as it can mean: (1) that remote users can view images streaming to the local user's location, (2) that a subset of remote users can view the local user's location, or alternatively (3) no remote users can view the local user. Who is allowed to view the local user's location when the curtain is open depends upon the collaboration configuration settings.

However, a user of a video-collaboration system (even with family members) can maintain natural privacy by controlling privacy and presence indication of the video-collaboration system. For instance, user 102a at location 130a would control (1) when a user 102b could view user 102a, and (2) the circumstances in which user 102a is viewed by user 102b. However, because in many systems the local user does not see what is being displayed to the remote users, the local user may not be aware that the system is transmitting signals (e.g. audio/visual) to a remote location. Also, the camera could be on one side of a see-through screen (see 118b in FIG. 1), such that a user on the other side of the see-through screen would be unable to notice that the camera is turned on and capturing images of the user. Likewise, a user may also be unable to determine that a microphone is capturing audio.

A user needs to understand easily: (1) when the remote user may be viewing him, (2) how to show his presence while retaining privacy and a choice of whether to interact: a local user, (3) how to alert the remote user that he is available to interact. In the present invention, the local user uses a physical curtain or other obscuring structure to determine and indicate availability for participating in a video collaboration system. When the moveable physical obscuring structure (curtain) is in a closed state, the local user is not available for interacting with remote users and no image that are accessible to remote users are transmitted to the remote user. When the moveable obscuring structure is in an open position, the local user can determine whom he is available to interact with and how he indicates his availability to others based on selected collaboration system privacy options. In the open position, what if any images and audio captured by the video camera are transmitted and to what remote participant locations the transmission is sent, and how it is displayed, are dependent upon the collaboration configuration settings in the collaboration control module 500.

As previously stated, the configuration settings are set using the configuration module 520 and can be (1) default settings set by the manufacturer, (2) settings established by the system administrator, or alternatively (3) settings established by the local user using the video collaboration system. Although not exhaustive, some of the collaboration configuration settings or parameters that can be set or controlled while in the video collaboration configuration mode are: the list of users in the video collaboration, the conditions under which transmission of accessible video will be transmitted to the remote users in the video conference, the display configuration, the display conditions (high contrast, blurred, etc.), the sensing device locations, the type of sensing devices, the location of the closed (and open) position boundaries or regions, etc. are all examples of parameters that can be set while in the configuration mode.

In one embodiment, menus (for example, as shown in FIG. 6A) or displays (for example, as shown in FIG. 6B) are available to the users to interact with the system while in the configuration mode or alternatively while engaging in a collaboration session. FIG. 6A shows an exemplary menu for a video collaboration system while in configuration mode according to an embodiment of the invention. FIG. 6B shows a combined screen display indicating availability and presence of users according to an embodiment of the invention.

In one embodiment, the menu and display shown in FIGS. 6A-6B as wall of windows or display of all the users is shown on a separate physical display or separate monitor than the display screen. For example, a separate laptop could be used as a control and interface device to the system. In another example, a region of the display screen that is not covered when the physical obscuring structure is in the closed position is designated to be used as a display. In another embodiment, when the obscuring structure is in the open position, the display screen of the video collaboration system is used to show the menu and/or display shown in FIGS. 6A-6B.

FIG. 6A shows an exemplary menu 600 for a video collaboration system while in configuration mode. In one embodiment, the configuration modules allows the user or system choose the list of users that the local user can interact with The menu can be an interface to add or remove participants (see line 610) from a list of users that the local user is available to collaborate with.

The conditions for which the local user chooses to interact with the remote users may be the same for all remote user locations or alternatively may be different for each remote users or a subset of remote users. For example, the local user may choose different availability for interaction based on time and date (see line 620). For example, the local user can configure his system 108 to show video images of his location to co-workers as Monday through Friday from 8 a.m. to 5 p.m. However, during a specific date and time when, the local user is involved in a video conference meeting with his supervisor, he may choose to over ride his default setting and restrict access to his location during the meeting time so that only his supervisor has access to his location.

When the obscuring structure is in the closed position, the local user is not available to any remote users. Unavailability of the local user may be shown in many ways-typically by showing some visual distinction or characteristic that is different for the class of users who are not available compared to the class of users who are not available. In one example (and as shown in FIG. 6B), the graphical representation is a small frame or square showing the local user's location with curtains closed while the class of users who are available are shown with the curtains pulled back and their windows open. The graphical representation of the users may be a representative image or photo or a video of each user's location. In the event that a video is shown, the location should be identified with the remote user's name or other unique identifier so that the video can be identified with the remote user is they are not in view.

Besides showing unavailability by closed curtains, in another example unavailability of the user may shown by blurring, creating a shadowed image or otherwise distorting the local user's image. In another example, the availability of a user is shown by highlighting—the visual representation or name of the available user relative to the user who is not available. In another example, the local user's name or local user's name may have a line crossed thru it to indicate their current unavailability.

When the physical obscuring structure 118 is in the open state, the set of remote users who have access to the video streamed from the local user's location may be configured so that all remote users, a subset of remote users, or no remote users can see the availability of the local user to collaborate. In some cases, the local user (who has the curtains open) may not wish to indicate his presence to all potential viewers. Even though the local user's curtains are open, he may set his status or configure the system to control whether all or a subset of remote users can see that he is available. In one case, the local user may set his status so that no remote users know of his presence. The remote users who are not configured to see the local user's availability will see the local user's display with his curtains drawn—even though physically the local user's curtains may be open. During this time, the local user can still view the availability of users at remote destinations he would like to interact with, and he can do so without having to reveal his presence to the subset of users to whom his availability information is hidden.

As previously stated, the local user may indicate his availability to interact to all users or a subset of users. The combined screen display shown in FIG. 6B shows both presence and availability. The left hand side of the screen (region 642) shows the subset of remote users who can see the availability of the local user to interact when his curtains are open. The right hand side of the screen (region 644) shows the subset of remote users who cannot see the availability of the local user to interact when the local user's curtains are open.

In the implementation shown in FIG. 6B, Users A, B, C and D can see that the local user is available to interact (the local user's curtains are open and video transmitted from the local user's location is accessible.) Similarly, Users E, F, G and H do not see that the local user is available to interact (video from the local user's location is not accessible). If the local user wishes to change the settings so that a remote user from region 644 can see his availability, he may do so by changing the configuration settings. Alternatively, in one embodiment of the invention, the local user would simply click on the image of the local user he wished to provide availability information to and drag the remote user whom he wishes to let know of his availability over to region 642.

As previously stated, FIG. 6B shows not only the set of remote users who can see the local user's availability and those who cannot, but also the availability of the remote users to the local user. For example as seen in region 642, the local user is available to remote User A, however, remote User A (whose curtains are closed) is not available to interact with the local user. In contrast, remote User B (whose curtains are open) is available to interact.

In some cases, a local user may have his curtains open—inviting people in to view—but leave the room or otherwise not notice that a remote user is viewing his location. The local user may configure the system to provide a visual trigger or an audio trigger to indicate when a remote user is viewing them. For example, the local user might configure the display so that if a remote user wishes to collaborate or view the local user's, the display screen automatically changes from the previous display to the view of the remote user's location. In another embodiment, the lighting of the display might change in intensity to provide a visual indication that a remote user is viewing the local user's location.

In another embodiment, audio cues are used to let the local user know that a remote user has initiated a collaboration session and may be viewing their location. In this case, a lingering audio cue may be used to act as a continuous reminder that the local user is being viewed. For example, if the display displays an outdoor scene of a homeowner's window, a lingering audio cue of a bird chirping might be used. Alternatively, the local user could set the audio cue to be a particular song that acts as a presence indicator—that someone is watching their location.

Figure 7:
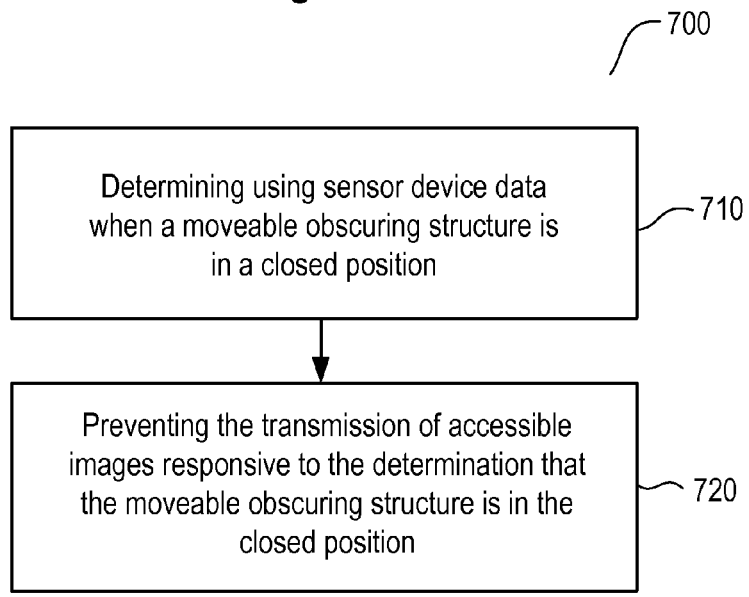
FIG. 7 illustrates a flow diagram for a method of providing access a control in a video collaboration system according to an embodiment of the present invention.

FIG. 7 illustrates a flow diagram for a method of providing collaboration information according to an embodiment of the present invention. Referring to FIG. 7 shows the step, determining using sensing device data when a moveable obscuring structure is in a closed position (step 710). If the sensing device data indicates that the obscuring structure is in the closed position, the transmission of accessible images to remote users in a video conference session is prevented (step 720).

It should be apparent to those of ordinary skill in the art that the method 700 represents generalized illustrations and that other steps may be added or existing steps may be removed, modified or rearranged without departing from the scopes of the method 700. The descriptions of the method 700 are made with reference to the system 100 illustrated in FIG. 1 and the system 500 illustrated in FIG. 5. and thus refers to the elements cited therein. It should, however, be understood that the method 700 is not limited to the elements set forth in the system 500. Instead, it should be understood that the method 700 may be practiced by a system having a different configuration than that set forth in the system 500.

Some or all of the operations set forth in the method 700 may be contained as utilities, programs or subprograms, in any desired computer accessible medium. In addition, the method 700 may be embodied by computer programs, which may exist in a variety of forms both active and inactive. For example, they may exist as software program(s) comprised of program instructions in source code; object code, executable code or other formats. Any of the above may be embodied on a computer readable medium, which include storage devices and signals, in compressed or uncompressed form.

Figure 8:
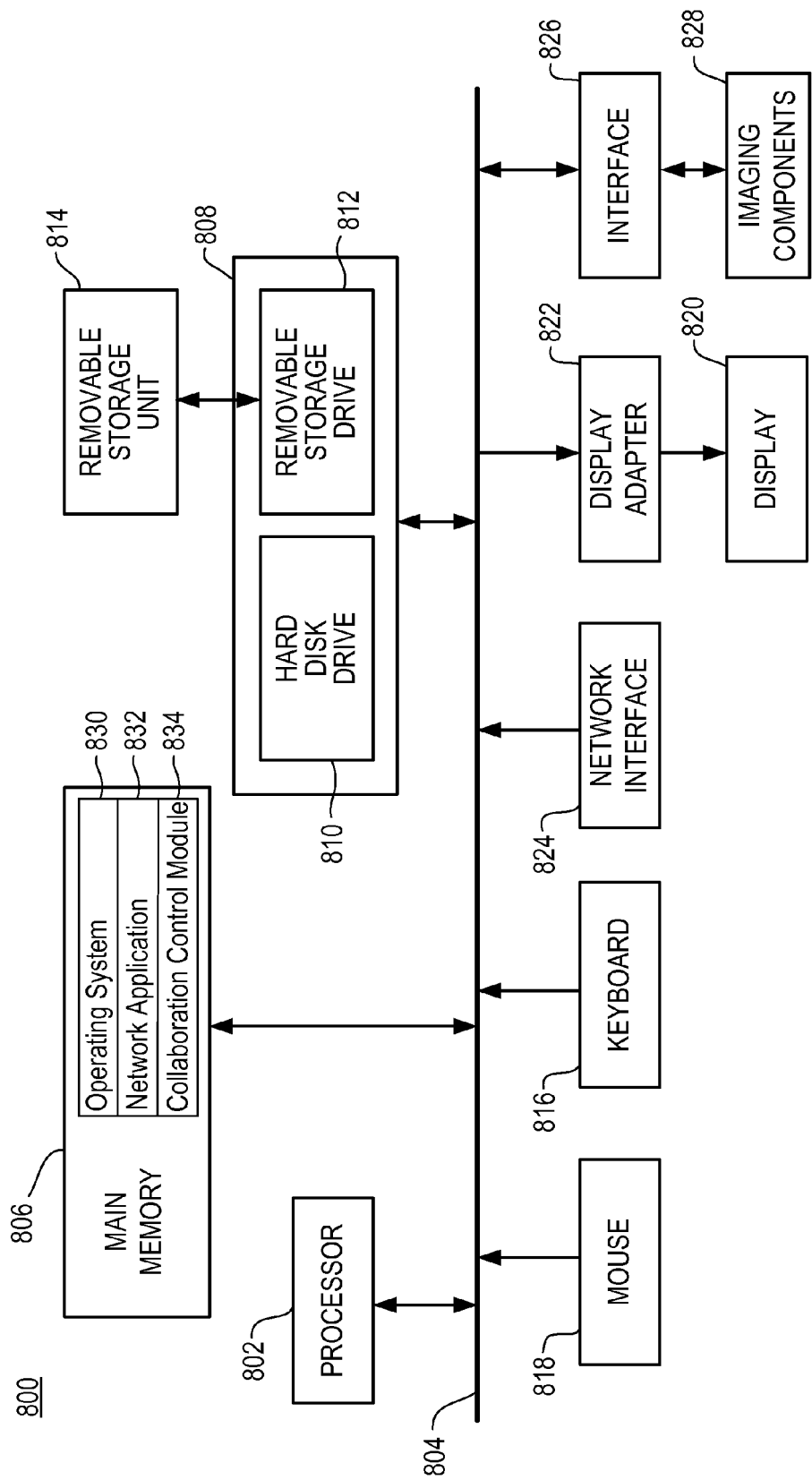
FIG. 8 illustrates a computer system for implementing the methods in according with the present invention.

FIG. 8 illustrates a block diagram of a computing apparatus 800 configured to implement or execute the methods 700 depicted in FIG. 7, according to an example. In this respect, the computing apparatus 800 may be used as a platform for executing one or more of the functions described hereinabove with respect to the collaboration control module 500.

The computing apparatus 800 includes one or more processor(s) 802 that may implement or execute some or all of the steps described in the methods 700. Commands and data from the processor 802 are communicated over a communication bus 804. The computing apparatus 800 also includes a main memory 806, such as a random access memory (RAM), where the program code for the processor 802, may be executed during runtime, and a secondary memory 808. The secondary memory 808 includes, for example, one or more flash storages 810 and/or a removable storage drive 812, representing a removable flash memory card, etc., where a copy of the program code for the method 700 may be stored. The removable storage drive 812 reads from and/or writes to a removable storage unit 814 in a well-known manner.

Exemplary computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any electronic device and/or system capable of executing the functions of the above-described embodiments are encompassed by the present invention.

Although shown stored on main memory 806, any of the memory components described 806, 808, 814 may also store an operating system 830, such as Mac OS, MS Windows, Unix, or Linux; network applications 832; and a collaboration and control module 834. The operating system 830 may be multi-user, multiprocessing, multitasking, multithreading, real-time and the like. The operating system 830 may also perform basic tasks such as recognizing input from input devices, such as a keyboard or a keypad; sending output to the display 820; controlling peripheral devices, such as disk drives, printers, image capture device; and managing traffic on the one or more buses 804. The network applications 832 includes various components for establishing and maintaining network connections, such as software for implementing communication protocols including TCP/IP, HTTP, Ethernet, USB, and FireWire.

The computing apparatus 800 may also include an input devices 816, such as a keyboard, a keypad, functional keys, etc., a pointing device, such as a tracking ball, cursors, etc., and a display(s) 820, such as the screen display 118 shown in FIG. 1. A display adaptor 822 may interface with the communication bus 804 and the display 820 and may receive display data from the processor 802 and convert the display data into display commands for the display 820.

The processor(s) 802 may communicate over a network, for instance, a cellular network, the Internet, LAN, etc., through one or more network interfaces 824 such as a Local Area Network LAN, a wireless 802.11x LAN, a 3G mobile WAN or a WiMax WAN. In addition, an interface 826 may be used to receive an image or sequence of images from imaging components 828, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. An apparatus for controlling accessibility of images captured by a image capture device in a video collaboration system, the apparatus comprising:

an obscuring structure capable of being moved into a first open position relative to a display screen in a video collaboration system and a second closed position relative to the display screen of a video collaboration system, wherein responsive to data from a first sensing device indicating that the obscuring structure is in a closed position, the transmission of accessible video images captured by the video capture device to at least one remote user participating in a video collaboration session is prevented, and wherein the obscuring structure at least partially obscures the display screen with respect to a local user in response to being moved into the second closed position.

2. The apparatus recited in claim 1 wherein responsive to receiving data from the sensing device indicating that the obscuring structure is in an open position, transmission is controlled by parameters set in the configuration mode of a collaboration control module.

3. The apparatus recited in claim 1, wherein a first sensing component of the sensing device is integrated into the obscuring structure.

4. The apparatus recited in claim 1, wherein the first sensing component is capable of interacting with a second sensing component when the first and second sensing components are in proximity to the closed position, wherein the interaction of the two sensing components provides an indicator that the obscuring structure is in the closed position.

5. The apparatus recited in claim 4, wherein the first and second sensing components are magnets and the indicator that the obscuring structure is in the closed position is a current created by a closed circuit.

6. The apparatus recited in claim 4, wherein the first sensing component is an optical sensor.

7. The apparatus recited in claim 6, further including a second sensing component of the sensing device, wherein the second sensing component is a pattern integrated onto the obscuring structure, the second sensing component capable of being read by the first sensing component.

8. A computer implemented method, comprising the steps of:
    determining using data from a sensing device, when a moveable obscuring structure is in a closed position;
    preventing the transmission of accessible images captured by an image capture device at the location of a local user to remote user locations in a video conference session, responsive to the determination that the moveable obscuring structure is in the closed position; and
    determining the remote participants who are available and the remote users who are not available to collaborate in a video collaboration session;
    where the remote users who are not available to collaborate in a video collaboration session are represented by a representation of the obscuring structure in the closed position.

9. The method recited in claim 8 further including the step of determining using sensing device data when a moveable obscuring structure is in the open position.

10. The method recited in claim 9, wherein when the obscuring structure is in the open position, transmitting accessible images of the local user based on the configuration settings of the configuration module.

11. The method recited in claim 8, further including the step of displaying the location of the remote participants that are available to collaborate in a video collaboration session with the local user, by showing a representation of the remote user with the obscuring structure in the open position.

12. The method recited in claim 8, wherein the remote users are not able to tell whether the local user is viewing their availability to participate.

13. A collaboration control module for controlling accessibility of images to a video collaboration system, the collaboration control module comprising:
    a configuration module capable of setting conditions for determining accessibility of transmitted images in a video collaboration session;
    an obscuring structure position detector module for utilizing data from a sensing device to determine the position of the obscuring structure;
    a transmission control module capable of utilizing data from the sensing device to determine whether data from an image capture device is transmitted to at least one remote user in a video collaboration session; and
    an availability and presence indicator module capable of determining a first subset of the remote users who are available and a second subset of the remote users who are not available to collaborate in the video collaboration session and capable of causing the location of the first subset of remote users that are available to collaborate in the video collaboration session with the local user to be displayed by showing a representation of the remote user with the obscuring structure in the open position;
    wherein based on sensor device data that the obscuring structure is in the closed position, the transmission control module prevents transmission of images captured by the image capture device to the remote user in the video collaboration session.

14. A video conferencing system, the system comprising:
    an image capture device;
    a display screen;
    a moveable obscuring structure for obscuring at least a portion of the display screen when in the closed position; and
    at least one sensing device capable of sensing when the moveable obscuring structure is in the closed position, responsive to sensing that the moveable obscuring structure is in the closed position, preventing the transmission of accessible images captured by the image capture device to at least a remote user location.

* * * * *